US012679035B2

(12) United States Patent
Allain Launay et al.

(10) Patent No.: US 12,679,035 B2
(45) Date of Patent: Jul. 14, 2026

(54) METHOD AND SYSTEM FOR PRODUCING A DECORATIVE OBJECT

(71) Applicant: BLACHERE ILLUMINATION, Apt (FR)

(72) Inventors: Romain Allain Launay, Apt (FR); Johan Hugues, Apt (FR); Benjamin Debat, Apt (FR); Dorian Fabre, Apt (FR)

(73) Assignee: BLACHERE ILLUMINATION, Apt (FR)

( * ) Notice: Subject to any disclaimer, the term of this patent is extended or adjusted under 35 U.S.C. 154(b) by 279 days.

(21) Appl. No.: 18/556,156

(22) PCT Filed: Apr. 22, 2022

(86) PCT No.: PCT/FR2022/000040
§ 371 (c)(1),
(2) Date: Oct. 19, 2023

(87) PCT Pub. No.: WO2022/223889
PCT Pub. Date: Oct. 27, 2022

(65) Prior Publication Data
US 2024/0208147 A1 Jun. 27, 2024

(30) Foreign Application Priority Data

Apr. 19, 2021 (FR) ...................................... 2104046
Apr. 19, 2021 (FR) ...................................... 2104048

(51) Int. Cl.
B29C 64/364 (2017.01)
B29C 64/118 (2017.01)
(Continued)

(52) U.S. Cl.
CPC .......... B29C 64/364 (2017.08); B29C 64/118 (2017.08); B29C 64/209 (2017.08);
(Continued)

(58) Field of Classification Search
CPC ... B29C 64/364; B29C 64/118; B29C 64/209; B29C 64/245; B29C 64/194;
(Continued)

(56) References Cited

U.S. PATENT DOCUMENTS 9,463,598 B2 10/2016 Rockhold
12,049,039 B2 * 7/2024 Susnjara ............... B29C 64/241
(Continued)

FOREIGN PATENT DOCUMENTS

CN 108888302 A 11/2018
FR 3069800 A1 2/2019
(Continued)

OTHER PUBLICATIONS

International Search Report mailed on Aug. 10, 2022, in corresponding International Application No. PCT/FR2022/000040, 6 pages.

*Primary Examiner* — Nahida Sultana
(74) *Attorney, Agent, or Firm* — Maier & Maier, PLLC

(57) ABSTRACT

A method for manufacturing a decorative object from at least a first layer of a hot-extruded strand of a polymer-based composition, including a step of passing a polymer-based composition through an extrusion die from an inlet supplying the composition to an extrusion head from which the extruded strand emerges in an ambient environment, the first layer of extruded strand deposited on a reception support, and the method includes the steps of: using a polymer-based composition of recycled polyethylene terephthalate or a mixture of recycled polyethylene terephthalate and non-recycled polyethylene terephthalate, heating the composition so that the temperature of the extruded strand, at the outlet of the extrusion head is between 200° C. and 300° C., cooling the reception support to force the cooling of the first layer of extruded strand by conduction, the temperature of
(Continued)

the cooling of the support being lower than the temperature of the ambient environment.

13 Claims, 6 Drawing Sheets

(51) Int. Cl.

| | |
|---|---|
| *B29C 64/209* | (2017.01) |
| *B29C 64/245* | (2017.01) |
| *B29K 67/00* | (2006.01) |
| *B29K 105/26* | (2006.01) |
| *B33Y 10/00* | (2015.01) |
| *B33Y 30/00* | (2015.01) |
| *B33Y 70/00* | (2020.01) |
| *B33Y 80/00* | (2015.01) |

(52) U.S. Cl.
CPC ............ *B29C 64/245* (2017.08); *B33Y 10/00* (2014.12); *B33Y 30/00* (2014.12); *B33Y 70/00* (2014.12); *B29K 2067/003* (2013.01); *B29K 2105/26* (2013.01); *B29K 2905/02* (2013.01); *B29K 2905/10* (2013.01); *B33Y 80/00* (2014.12)

(58) Field of Classification Search
CPC ......... B33Y 10/00; B33Y 30/00; B33Y 70/00; B33Y 80/00; B33Y 40/00; B29K 2067/003; B29K 2105/26; B29K 2905/02; B29K 2905/10

See application file for complete search history.

(56) References Cited

U.S. PATENT DOCUMENTS

| | | | |
|---|---|---|---|
| 2013/0241102 A1* | 9/2013 | Rodgers ................. | B33Y 40/10 |
| | | | 29/890.1 |
| 2014/0141168 A1* | 5/2014 | Rodgers ................. | B33Y 70/00 |
| | | | 427/265 |
| 2015/0321434 A1* | 11/2015 | Sterman ............... | A43C 15/162 |
| | | | 264/255 |
| 2016/0311972 A1* | 10/2016 | Sacripante .......... | C08G 63/183 |
| 2018/0264750 A1 | 9/2018 | Tierney et al. | |
| 2018/0370165 A1* | 12/2018 | Hikmet .................. | B29C 64/30 |
| 2019/0168300 A1* | 6/2019 | Gelbart .................. | B28B 7/346 |
| 2020/0298481 A1* | 9/2020 | Sankare ................ | B29C 64/295 |
| 2020/0298492 A1* | 9/2020 | Yirmibesoglu ......... | B29B 7/826 |
| 2021/0039306 A1 | 2/2021 | Busbee | |
| 2021/0170671 A1* | 6/2021 | Myllymäki ............. | C01B 32/28 |
| 2021/0252783 A1* | 8/2021 | Pavanaskar ........... | B29C 64/245 |
| 2022/0402208 A1* | 12/2022 | Inomoto .............. | B29C 64/245 |

FOREIGN PATENT DOCUMENTS

| | | | |
|---|---|---|---|
| FR | 3075313 | A1 | 6/2019 |
| WO | 2019109205 | A1 | 6/2019 |
| WO | 2020016114 | A1 | 1/2020 |

* cited by examiner

METHOD AND SYSTEM FOR PRODUCING A DECORATIVE OBJECT

FIELD

The object of the invention is a method and a system for manufacturing a decorative object.

The invention relates in particular, but not exclusively, to the technical field of temporary or permanent luminous decorations, and more precisely to luminous decorations located outdoors, such as those traditionally installed for celebrations and other events. The invention can also find many other applications, for example in the field of advertising decorations or for promotions in shop windows.

BACKGROUND

Through the patent documents FR3075313 and FR3069800 in the name of the applicant, methods are known for manufacturing a decorative object from at least one first layer of a hot-extruded strand of a polymer-based composition. This type of method is particularly advantageous since it makes it possible to obtain an object the shape of which is complex, in particular an object with volume and/or with one or more curved contours.

The composition described in FR3075313 and FR3069800 is based on polymers or copolymers of the ABS (acrylonitrile butadiene styrene), ASA (acrylonitrile styrene acrylate) or SMMA (styrene methyl methacrylate) type, these materials being used for their resistance to impact and to ageing. However, these materials are relatively expensive synthesis materials that are difficult to recycle and/or have a negative impact on our environment.

The invention aims to remedy this state of affairs. Thus one objective of the invention is to propose a method for manufacturing a decorative object from at least one first layer of an extruded strand, but the impact of which on our environment is reduced, while making it possible to obtain a decorative object that has a beautiful aesthetic appearance, and is stable and sufficiently strong from a mechanical, chemical and thermal point of view, having regard to the degraded climatic conditions in which the object may be used. This is because this object is intended to be installed preferentially outdoors, whatever the environmental conditions.

Another objective of the invention consists in proposing an economical and reliable manufacturing method, i.e. one making possible, in an ambient environment, easy industrial production and perfect reproducibility of the object as many times as required.

SUMMARY

After many tests and attempts, the applicant has developed a method enabling it to achieve the aforementioned objectives.

The solution proposed by the invention is a method for manufacturing a decorative object from at least a first layer of a hot-extruded strand of a polymer-based composition, including a step of passing a polymer-based composition through an extrusion die from an inlet supplying said composition to an extrusion head from which the extruded strand emerges in an ambient environment, the first layer of extruded strand being deposited on a reception support.

The method according to the invention comprises the following remarkable steps:

using a polymer-based composition comprising recycled polyethylene terephthalate or a mixture of recycled polyethylene terephthalate and non-recycled polyethylene terephthalate, heating the composition so that the temperature of the extruded strand, at the outlet of the extrusion head, is between 200° C. and 300° C., cooling the reception support so as to force the cooling of the first layer of extruded strand by conduction, the temperature of cooling of said support being lower than the temperature of the ambient environment.

The use of recycled PET makes it possible to recycle some of this plastics material abundantly used at the present time, in particular in bottles. Thus it is possible to create a decorative object that is easy to produce and virtuous with respect to ecological considerations.

By means of the precise parameterising of the temperature of the strand at the outlet of the extrusion head and the forced cooling of the first layer of extruded strand, a decorative object is obtained with very good aesthetic and mechanical qualities and optimum physical and chemical properties for varied uses in an environment that is often very rigorous. The applicant has in particular found surprisingly that these properties are improved in comparison with those obtained with the method taught in the patent documents FR3075313 and FR3069800, namely maintaining the heating of the strand after extrusion thereof and/or heating the reception support. The patent document WO 2020016114 discloses a method intended to apply a material containing a meltable polymer, but this method applies to hot melts, this document not making any mention or disclosing any example of a polymer-based composition comprising recycled polyethylene terephthalate or a mixture of recycled polyethylene terephthalate and non-recycled polyethylene terephthalate.

Also by virtue of the method according to the invention, the manufacturing method is automated so as to eliminate, or at the very least to limit, labour.

The expression "cooling temperature" means, in relation to the reception support, the fact that the latter has this temperature at its top surface, i.e. the surface in contact (or liable to be in contact) with the extruded strand.

The expression "decorative object" means an object that has as its purpose the aesthetic decoration of a place, indoors or outdoors. Naturally, this decorative object may be associated with one or more other visual elements such as for example garlands or lights and, in this case, the decorative object also serves as a support for these elements associated with a decorative object.

The expression "mixture of recycled polyethylene terephthalate (PET) and non-recycled polyethylene terephthalate" means a mixture based on recycled polyethylene terephthalate incorporating or including an addition of non-recycled polyethylene terephthalate, i.e. not resulting from a recycling process, coming from a direct synthesis of polyethylene terephthalate. This non-recycled PET may consist of so-called "virgin" PET or PET-G, glycol-modified polyethylene terephthalate, and this non-recycled PET may have, in whole or in part, virgin PET and/or PET-G. In other words, the non-recycled PET may itself consist of a PET mixture, typically a mixture of PET and PET-G, or consist entirely of PET-G.

The expression "temperature of the ambient environment" means a temperature of between 15° C. and 30° C. for a pressure of approximately 1 atmosphere ($10^5$ pascals).

Other advantageous features of the invention are listed below. Each of these features can be considered alone or in combination with the remarkable features defined above. Each of these features contributes, where applicable, to solving the specific technical problems defined above in the description and in which the remarkable features defined above do not necessarily participate. The latter may be the subject, where applicable, of one or more divisional patent applications:

According to one embodiment, the cooling temperature of the reception support is selected so that the cooling rate of the first layer of extruded strand is between 250° C./min and 350° C./min.

According to one embodiment, the reception support is produced from a material selected from the following family: aluminium, aluminium alloy, copper and copper alloy.

According to one embodiment, the reception support is cooled to a temperature of between –10° C. and +10° C.

According to one embodiment, the polymer-based composition has at least 99% by mass polyethylene terephthalate and the following residual quantities: no more than 50 ppm of polyvinyl chloride, no more than 100 ppm of water and no more than 30 ppm of polyethylene.

According to one embodiment, the polymer-based composition has at least 50% by weight recycled polyethylene terephthalate.

According to one embodiment, the decorative object comprises a plurality of layers of extruded strands, each successive layer, after the first layer of extruded strand, then forming the support for receiving the following layer of extruded strand.

According to one embodiment, the extruded strand is cooled by blowing a gas so as to force the cooling of said strand by convection, said gas being blown at a temperature of less than or equal to the temperature of the ambient environment.

According to one embodiment, the decorative object comprises a plurality of layers of extruded strands, each successive layer, after the first layer of extruded strand, being cooled by blowing a gas so as to force the cooling of said strand by convection, said gas being blown at a temperature of less than or equal to the temperature of the ambient environment.

According to one embodiment, the cooling temperature of the gas is selected so that the cooling rate of the extruded strand is between 250° C./min and 350° C./min.

According to one embodiment, the temperature of the gas is between –10° C. and +10° C.

According to one embodiment, the extrusion of the strand and the blowing of the gas are implemented concomitantly during the movement of the extrusion head (51) along the path.

According to one embodiment, the method comprises a step of securing one or more gas-blowing nozzles to the extrusion head.

According to one embodiment, the method comprises a step of securing one or more gas-blowing nozzles to a movement means, said movement means being controlled so that the nozzle or nozzles move at the same time as the extrusion head and on the same path.

According to one embodiment, the method comprises the steps of: —securing the extrusion head to a robotic manipulation arm; —controlling the arm so as to move the extrusion head on a path so that the extruded strand forms a decorative object having at least one curved contour.

According to one embodiment, the method comprises the steps of: —securing the extrusion head to a movement means; —controlling the movement means so as to move the reception support on a path so that the extruded strand forms a decorative object having at least one curved contour.

Another aspect of the invention relates to a system for manufacturing a decorative object from at least one first layer of a hot-extruded strand of a polymer-based composition, including:

an extrusion die having at one end a feed inlet and at the other end an extrusion head, said die being supplied with at least one polymer-based composition emerging, in the ambient environment, in the form of a strand extruded by the extrusion head, a reception support on which the first layer of extruded strand is deposited, the polymer-based composition comprises recycled polyethylene terephthalate or a mixture of recycled polyethylene terephthalate and non-recycled polyethylene terephthalate, the temperature of the extruded strand, at the outlet of the extrusion head, is between 200° C. and 300° C., the reception support incorporates cooling means so as to force the cooling of the first layer of extruded strand by conduction, the temperature of cooling of said support being lower than the temperature of the ambient environment.

According to one embodiment, the system includes a means for blowing a gas onto the extruded strand so as to force the cooling of said strand by convection, said gas being blown at a temperature of less than or equal to the temperature of the ambient environment.

BRIEF DESCRIPTION OF THE FIGURES

Other advantages and features of the invention will emerge better from the reading of the description of a preferred embodiment that will follow, with reference to the accompanying drawings, produced by way of indicative and non-limitative examples and on which.

DETAILED DESCRIPTION OF EMBODIMENTS

The method and the system that are the object of the invention make it possible to produce decorative objects, in particular supports for decorations such as luminous decorations. These decorations each have a rigid object forming a support frame, and on which one or more luminous garlands are installed.

Figure 1:
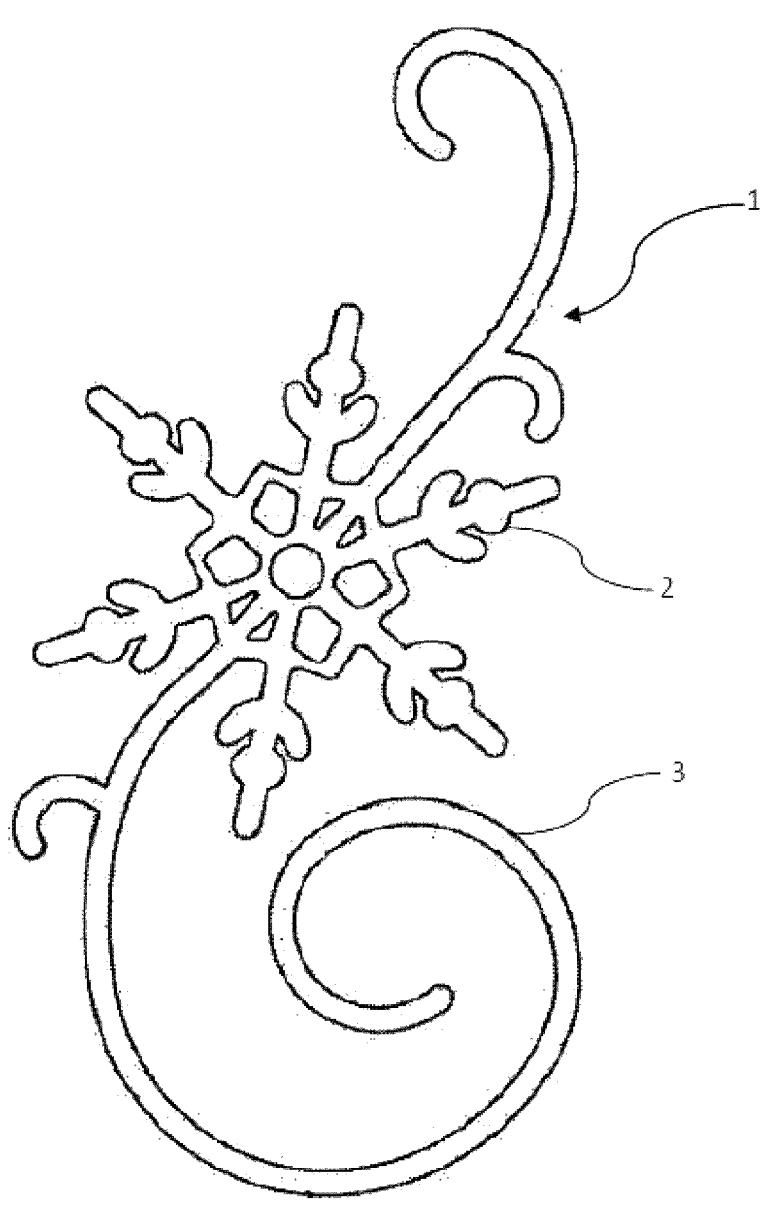
FIG. 1 is a schematic view of a decorative object able to be manufactured with the method and the system according to the invention.
Figure 2:
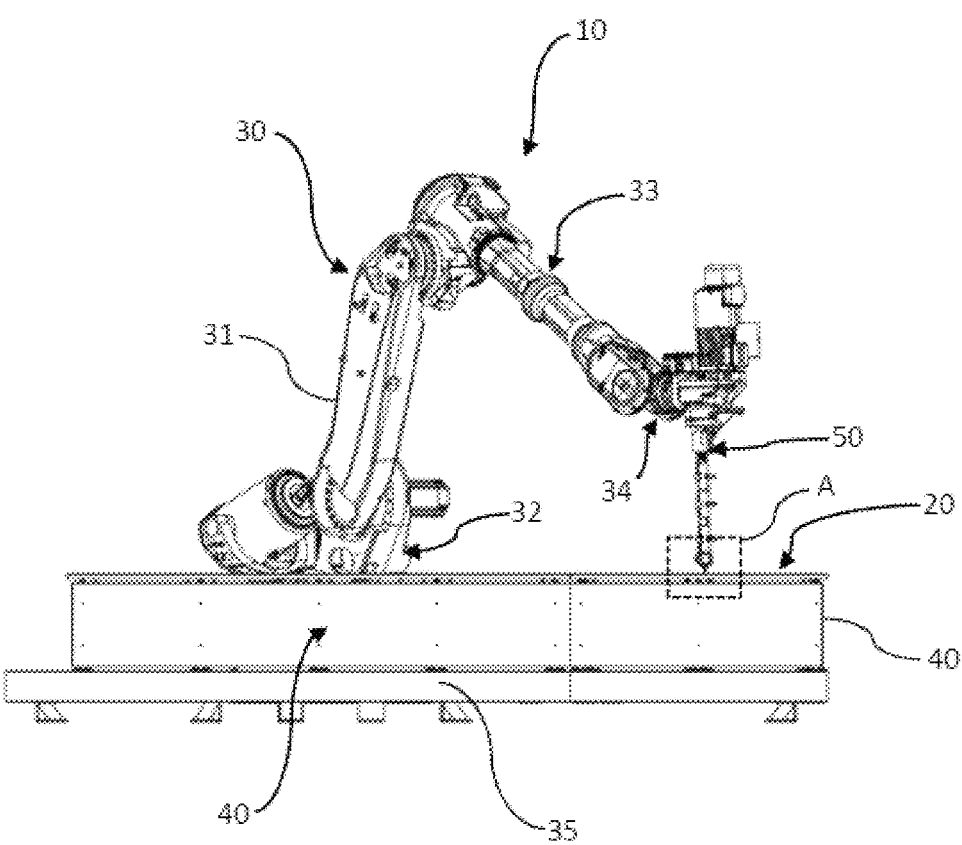
FIG. 2 is a side view of a manufacturing system according to the present invention.

On FIG. 1, the decorative object 1 consists of a stylised snowflake 2 installed on a volute 3. By way of example, its length is between 50 centimetres (cm) and two metres while its width is between 20 cm and one metre. With regard to its thickness, one particularity of the present invention lies in the fact that such an object is formed by at least one layer of extruded strand, optionally a plurality of layers of extruded strands, and these extruded strands all have a substantially identical thickness, between 3 mm and 10 mm. This object 1 can be attached to a cable or secured to a post or a wall for outdoor installation, example in a street or on the façade of a monument, or inside a dwelling. One or more luminous garlands, not visible on this appended figure, can be secured to this object 1. The garland can be secured by means of quick fasteners, such as clamping collars of the Rislan® type.

Selection of the Polymer-Based Composition.

In accordance with the invention, the object 1 is obtained by hot-extrusion of a polymer-based composition. This composition comprises recycled polyethylene terephthalate (PET) or a mixture of recycled PET and non-recycled PET.

The recycled PET comes from a recycling of bottles in accordance with the following successive steps:

collecting the PET sorting the PET grinding into flakes optionally cleaning the flakes to remove therefrom all the other constituents of the bottle.

To improve the quality of the flakes, reworkers sometimes implement a last purification step by optical sorting. For this purpose, use is made of various detection methods and cameras that will locate the last undesirable elements among the PET flakes. A blowing system next separates the PET flakes from the other types of plastics material. There are various PET flake typologies: those of light PET (coming from transparent or light-blue tinted bottles) and those of dark PET (coming from dark-blue, green or coloured bottles). In the context of the present invention, the recycled PET preferentially comes from flakes of dark PET.

The PET flakes will then begin an extrusion phase. This consists in melting the flakes at a temperature of approximately 280° C. to give rods that will be cooled in water and then cut to form granules. There are clear granules coming from clear PET and coloured granules coming from dark PET. The PET granules are next purified, for example by polycondensation.

It is during this last step that various recycled PETs are obtained, with regard to their quality or in other words their residual quantities. It is important to note here that there are substantially as many recycled PET compositions as there are PET recycling methods.

In its objective of producing an economical and technically satisfactory decorative object, the applicant made a selection first of all on the nature of the polymer selected, and then, once this polymer was selected, defining a selection among all the possibilities and variants of this selected polymer.

It was also found by the applicant, after various experiments and manipulations, that a particular recycled PET composition could satisfy all the requirements, mainly, but not exclusively, of a mechanical nature, for obtaining a decorative object.

According to an advantageous embodiment, a mixture of recycled PET and PET (not recycled) has at least 50% by weight recycled PET, preferentially at least 70% by weight recycled PET.

According to a preferred embodiment, the composition has at least 99% by mass PET and the following residual quantities:

no more than 50 ppm of polyvinyl chloride, advantageously no more than 10 ppm of polyvinyl chloride, no more than 100 ppm of water, advantageously no more than 10 ppm of water, and no more than 30 ppm of polyethylene.

The remaining less than 1% by weight of the polymer composition can consist of a polyester such as for example a PLA (polylactic acid polymer) or a PCL (polycaprolactone).

The water content is determined by Karl Fischer titration while the PVC (polyvinyl chloride) and PE (polyethylene) content can be obtained by various methods known to a person skilled in the art and which give identical or almost identical results, in particular ASTM D5991-17 (C or D method) of 2017 for PVC and ISO 11542-1 of 2001 or ISO 1133-1 of 2011 for PE.

Preferentially, the residual quantities furthermore have no more than five (5) ppm of metals. The term "metal" here means mainly, but not exclusively, metal hydroxides such as for example a sodium hydroxide, potassium hydroxide or calcium hydroxide. The applicant was able to determine that, beyond a certain quantity of metals, the latter have a negative impact on the mechanical and/or physical and chemical properties of the object manufactured.

Preferentially, the residual quantities furthermore have no more than ten (10) ppm of polyacrylonitrile (PAN). This PAN is a component that is liable to be found in greater or lesser quantity in recycled PET. However, once again, the applicant has shown a negative impact of this PAN, went present beyond a certain quantity, on the mechanical and/or physical and chemical properties of the object manufactured.

Highly advantageously, the residual quantities are:

no more than 20 ppm of polyvinyl chloride, no more than 20 ppm of water.

The applicant has shown that complying with these limits of residual quantity of PVC and water further improves the mechanical and/or physical and chemical properties of the object manufactured.

According to one possibility offered by the invention, the aforementioned composition is mixed with at least one additive to form the extruded strands, said additive being present in the "polymer-based composition—additive" mixture to the extent of no more than 40% by weight of said mixture.

Preferentially, the additive is present in the "polymer-based composition—additive" mixture to the extent of no more than 10% by weight of said mixture, preferably no more than 5% by weight of said mixture.

Advantageously, the additive consists of plasticisers, adhesion promoters, stabilisers/UV absorbers, antioxidants, flame retardant, pigments/dyes/whiteners and/or fillers. Here, use of the plural can mean a plurality of one and the same component, for example the expression "plasticisers" may refer to a plurality of plasticisers of one and the same composition and chemical nature/family. This same expression in the plural may also refer to a plurality of different components—from a mechanical point of view, the component is not unique—through their composition and their chemical nature/family, all belonging to the same category of additives, for example to the family of plasticising additives.

Tests and trials that enabled the applicant to evaluate and select the polymer-based composition preferentially used are presented hereinafter. For reasons of clarity, only some of these tests and trials performed by the applicant are presented below.

Tests Performed on Test Pieces:

Having regard to the use of the decorative object, the mechanical tests were decisive for assessing the plastics materials, and some of the results of the tests and trials performed by the applicant are presented in table 1 referenced as [Table 1]. Nevertheless, it must be noted that supplementary tests, for example on resistance to ageing—implemented according to the ISO 22088 series of international standards have shown results that were particularly interesting for the polymer-based compositions according to the invention.

Identical test pieces, obtained after extrusion, were formed to be able to perform the following standardised tests, i.e. in accordance with ISO 527-1 for determining the Young's modulus and the elongation at break and in accordance with ISO179-1 for Charpy notched impact.

TABLE 1

| test piece | Young's modulus (MPa) | Elongation at break (%) | Notched Charpy impact $(kJ \cdot m^{-2})$ |
|---|---|---|---|
| ABS plastics material | 1600 (±110) | 20 (±5) | 1.9 (±0.3) |
| PC plastics material | 2300 (±190) | 120 (±10) | 2.5 (±0.5) |
| PA66 plastics material | 1950 (±200) | 45 (±5) | 2.1 (±0.5) |
| PMMA plastics material | 80 | 3.5 (±0.4) | 1.8 (±0.3) |
| PET 95% pure + PE between 2-5% | no significant mechanical strength following extrusion | no significant mechanical strength following extrusion | no significant mechanical strength following extrusion |
| PET 99% pure +: PVC > 150 ppm H₂O > 80 ppm PE > 45 ppm | 1920 (±150) | 50 (±10) | 1.8 (±0.3) |
| PET 99% pure +: PVC~80 ppm H₂O~110 ppm PE~40 ppm | 1950 (±150) | 70 (±10) | 2.2 (±0.4) |
| PET 99% pure +: PVC~40 ppm H₂O~40 ppm PE~10 ppm | 2000 (±200) | 220 (±40) | 2.4 (±0.5) |
| PET 99% pure +: PVC~20 ppm H₂O~10 ppm PE~10 ppm | 2100 (±200) | 240 (±40) | 2.7 (±0.5) |

In [Table 1], the following abbreviations are used: ABS: Acrylonitrile butadiene styrene; PC: Polycarbonate; PA66: Polyamide 6-6; PMMA: Polymethyl methacrylate; PVC: Polyvinyl chloride; PE: Polyethylene; —H₂O: water. MPa means megapascal and $kJ \cdot m^{-2}$ means kilojoule per square metre.

The preferred test pieces—i.e. precisely those presented in the last two lines of [tbl 1]—are noted in [Table 1]. As can be seen, the preferred test pieces have better, or even much better, mechanical-property and extrusion-processability results than for the test pieces according to the prior art or comparative test pieces. These mechanical properties are those sought for a decorative object, according to conventional use thereof under sometimes rigorous environmental conditions: temperature (very much) below 0° C., very wet or very sunny environment, strength while showing very good resistance to impact and to elongation at break.

Other features and properties are taken into consideration for utility thereof as a decorative object, in particular its ability to be painted or coated with an adhesive layer and the stability of its mechanical properties when the variations in temperature and humidity are great.

Moreover, supplementary tests and trials showed better results when the residual quantities, in the composition based on polyethylene terephthalate, furthermore have no more than 5 ppm of metals and/or no more than 10 ppm of polyacrylonitrile.

In addition to these features particular to the polymer composition preferentially used in the context of the invention, it can comprise a certain number of additives or components intended to confer additional particular properties and/or to improve the intrinsic properties of the composition.

Thus, prior to the step of extruding the strands, the polymer-based composition according to the invention can be mixed with at least one additive so as to form a final mixture, having additional property or properties and/or function or functions.

Naturally, this additive is merely optionally present because of the excellent intrinsic properties of the composition based on recycled PET. It may be noted however that this composition has excellent mechanical properties, and thus it may be desired, or even necessary, to improve in particular its fire-resistant properties or its property of resistance to ageing under sun rays.

Plasticisers can be added to the composition in order to facilitate use and to improve the productivity of said composition. Aromatic or naphthalenic paraffinic mineral oils, which also improve the adhesion of the composition according to the invention, can be cited as examples. Phthalates, azelates, adipates and tricresyl phosphate can also be cited as plasticiser.

Adhesion promoters, although not necessary, can advantageously be added in order to improve the adhesion of the composition when this must be particularly high. The decorative object obtained according to the invention is intended to be used as such, without being associated with an additional object such as an aluminium frame or a frame made from another polymer material. Nevertheless, in the latter case in particular, the use of adhesion promoters is useful, or even necessary, in order to ensure perfect cohesion, bonding or association of the decorative object and another polymer-based element, created independently of said object. The adhesion promoter is a non-polymeric ingredient; it may be organic, crystalline, mineral and more preferentially semi-mineral semi-organic. Among these, mention can be made of organic titanates or silanes, such as for example monoalkyl titanates, trichlorosilanes and trialkoxysilane. Advantageously, trialkoxysilanes containing an epoxy, vinyl and amine group will be used.

When the decorative object is intended to remain outdoors for a long period in sunny regions of the globe, UV (ultraviolet) radiation is liable to cause slight yellowing of the polymer-based composition used so that UV stabilisers and UV absorbers such as benzotriazole, benzophenone and other hindered amines can advantageously be added in order to provide transparency or invariant colouring of the decorative object throughout its service life. These compounds can for example be based on benzophenone or benzotriazole. They can be added in quantities of less than 10% by mass of the total mass of the composition and preferentially from 0.1 to 5%.

Antioxidants can also be added to limit yellowing during manufacture and use of the decorative object, such as phosphor compounds (phosphonites and/or phosphites) and hindered phenolics. These antioxidants can be added in quantities of less than 10% by mass of the total mass of the composition and preferentially from 0.1 to 5%.

Flame-retarding agents can also be added. These agents may be halogenated or non-halogenated, use of the latter being advised, or even obligatory, according to the country. Among the halogenated agents, mention can be made of brominated products such as polybrominated diphenyls or phosphobrominated compounds. Use can also be made as non-halogenated agent of additives based on phosphorus such as phosphates, phosphonates and polyphosphonates, nitrogenous organophosphorus compounds, phosphines and phosphine oxide, antimony oxide, polyphosphate oxide, phosphinate oxide or pyrophosphate oxide, melamine cyanurate, pentaerythritol, zeolites, red phosphorus and mixtures of these agents. Among phosphine and phosphine oxide, mention can be made of triphenylphosphine oxide, triphenylphosphine with melamine phosphate or 1,4-diisobutyl-2,3,4,5,6-tetrahydroxy-1,4-diphosphacyclohexane 1,4-dioxide. Among phosphonates and polyphosphonates, mention can be made of cyclic phosphonate, polysulfonyldiphenylene phenylphosphonate, polysulfonyldiphenylene, phenyl thiophosphonate, sirophosphonate or polyphosphonate with biphenyl bridges. Among nitrogenous organophosphorus compounds, mention can be made of melamine phosphate pyrophosphate, or melamine polyphosphate, triphenylphosphine sulfide and diphosphonic acid. Among phosphates, mention can be made of bisphenol A and derivatives thereof, tribisphenylphosphate or resorcinol bis (diphenylphosphate). The composition may comprise these agents in proportions ranging from 0.5% to 25% with respect to the total mass of the mixture consisting of polymer-based composition according to the invention— additive(s), in the case of flame-retarding agents.

It is also possible to add pigments, such as for example titanium dioxide, or colouring or whitening compounds in proportions ranging up to a maximum of 10% with respect to the total mass of the mixture consisting of "polymer-based composition—additive(s)", in the case of pigments/colourants/whiteners.

Fillers, in particular of the mineral type, can also be added to improve the thermomechanical strength of the composition. Non-limitatively, silica, alumina or calcium carbonates or carbon nanotubes or glass fibres can be given as examples. These can be made of modified or non-modified clays that are mixed nanometrically; this makes it possible to obtain a more transparent composition.

For reasons of clarity, the tests performed by the applicant on the polymer-based composition used including one or more of the aforementioned additives are not presented here, but it has been assessed by the applicant that such additives improve the mechanical properties of the compositions and/or confer thereon novel functions, such as fire-resistant properties, or properties of adhesion to another polymer layer or of stability with respect to UV rays.

Description of the Method and the Manufacturing System.

FIGS. 2 to 7 set out to show the elements of a system for manufacturing a decorative object from at least one extruded strand of the aforementioned polymer-based composition. These elements allow the implementation of the method according to the invention so that a feature related to the system is applied to the method, and vice versa.

To melt the composition, an extrusion die 50 heats it. A strand then emerges from the extrusion head 51 into the ambient environment. Since the extrusion takes place in an ambient environment rather than in a controlled atmosphere and/or in a closed chamber, the parameterisations related to the extrusion and cooling temperatures described earlier in the description are particularly complex to control in order to ensure good repeatability of the method on an industrial level.

It is advantageous to regulate the heating temperature so that the strand does not emerge molten, or in a liquid state, but rather in a viscous state. The best results for industrial production of obtained when the temperature of the extruded strand, at the outlet of the extrusion head 51, is between 200° C. and 300° C., preferentially between 200° C. and 230° C. and highly preferentially at 215° C. (+/−5° C.).

The extruded strand advantageously has a width of between 5 mm and 10 mm, preferentially between 6 mm and 8 mm, and highly preferentially of 7 mm (+/−0.5 mm). And advantageously a height of between 2 mm and 10 mm, preferentially between 3 mm and 5 mm, and highly preferentially of 4 mm (+/−0.5 mm). When the strand emerges from the extrusion head 51, it has a circular cross-section, but following the deposition thereof on the reception support 20, it flattens so as ultimately to have a greater width than its height, in accordance with the data presented above.

Such a strand is thus relatively fine while being sufficiently mechanically strong. The width and/or the height of the extruded strand depend in particular on the opening diameter of the extrusion head 51 and on the distance or height at which the extrusion head is located from the surface of the reception support 20 (for the first layer) or from the last extruded layer of strands (for a multilayer structure). A strand having very good mechanical strength is obtained when the extrusion distance or height corresponds to the diameter of opening of the extrusion head 51. The diameter of opening of the extrusion head 51 is preferentially fixed, but may be variable throughout the duration of extrusion of the object 1. In the case where this opening diameter is variable or different during the manufacture of the decorative object 1, the preferred ratio defined previously between the extrusion distance or height and the diameter of opening of the extrusion head remains valid. Thus, if the opening diameter is modified during manufacture, then the extrusion distance or height is modified accordingly.

According to one embodiment, the extrusion head 51 is secured to a movement means. On FIG. 2, this movement means is a robotic manipulation arm 30. The extrusion head 51 is secured to this robotic arm 30, which moves it longitudinally, transversely and optionally vertically. The arm 30 is an articulated arm with 3 axes or, preferentially, an articulated arm with 6 axes.

Such an articulated arm makes it possible to move the extrusion head 51 in translation along the axes X (abscissa), Y (ordinate) and Z (applicant) of a Cartesian reference frame, or orthonormal reference frame. The extrusion head 51 remains oriented vertically, to keep the extrusion direction perpendicular to the surface of the reception support 20. A 3-axis articulated arm makes it possible to produce relatively complex objects, in 2D or 3D, with one or more curved contours, such as the one illustrated on FIG. 1.

In the example of FIGS. 2 to 6, the robotic arm 30 comprises: a base 32 mounted so as to be able to rotate on a vertical axis on a pedestal 35; a main arm 31 mounted so as to be able to rotate on a horizontal axis on the base 32; a forearm 33 mounted so as to be able to rotate on a horizontal axis on the main arm 31. An articulation makes it possible to assemble a coupling head 34 at the distal end of the forearm 33, said head cooperating with a coupling member 30 of the extrusion die 50. The connections between the base 30 and the pedestal 35, between the main arm 31 and the base 35, between the forearm 33 and the main arm 31, and between the forearm 33 and the coupling head 34, form the articulations of the robotic arm 30.

The dimensions of the main arm 31 and the forearm 33 are adapted to the use of the robotic arm 30, i.e. to the manufacture of the object 1 on the reception support 20.

Actuation means, of the jack and/or rotary motor type, disposed at these articulations, produce translation and optionally rotation movements of the extrusion head 51.

The direction and speed of movement of the robotic arm 30 are controlled by an electronic management unit. This management unit is in particular in the form of a portable or fixed computer, provided in particular with a processor, microprocessor or CPU (standing for central processing unit) and a memory, in which software is recorded the instructions of which, when they are executed by the processor, microprocessor or CPU, control the movement of the extrusion head 51 in space. The term "software" can be understood as: computer application, computer programs or software. For reasons of clarity, it must be understood, within the meaning of the invention, that "the robotic arm 30 does something" means "the software executed by the processor, microprocessor or CPU of the electronic management unit does something".

According to one embodiment, the robotic arm 30 is controlled so that the speed of movement of the extrusion head 51 is between 50 mm/s and 110 mm/s, the speed depending in particular on the viscosity of the extruded strand. A speed of movement of between 50 mm/s and 60 mm/s is preferred, this speed range making it possible to obtain a strand with a particularly aesthetic smooth appearance, in particular when the viscosity thereof at the discharge from the extrusion head 51 is between 400 and 450 pascals per second defined in accordance with ISO 11443.

The electronic management unit also manages the extrusion die, i.e. in particular the supply with polymer-based composition and the extrusion rate.

The movement of the extrusion head 51 on a predefined path makes it possible to manufacture an object 1 by adding material (additive manufacturing), and more particularly by a strand of extruded thermoplastic material which where applicable stacks in layers. These layers can be stacked on top of each other and/or alongside each other. This stacking creates the volume of the object. The path of the extrusion head 51 on the X and Y axes, and optionally the Z axis, makes it possible to produce the curved contours of the object 1.

According to one embodiment, a designer draws the object 1 by means of a computer aided design (CAD) tool. The file obtained is processed by the software recorded in the memory of the management unit, which organises the path of the extrusion head 51 for producing the object 1. The robotic arm 30 is controlled on this path, so that the extrusion head 51 deposits a first layer of strand on the support 20 until the final object 1 is obtained. The object 1 is thus obtained quickly and precisely and with optimum repeatability. When the object 1 comprises a plurality of layers of extruded strands, each successive layer, after the first layer, then forms the support for receiving the following layer of extruded strand.

Figure 7:
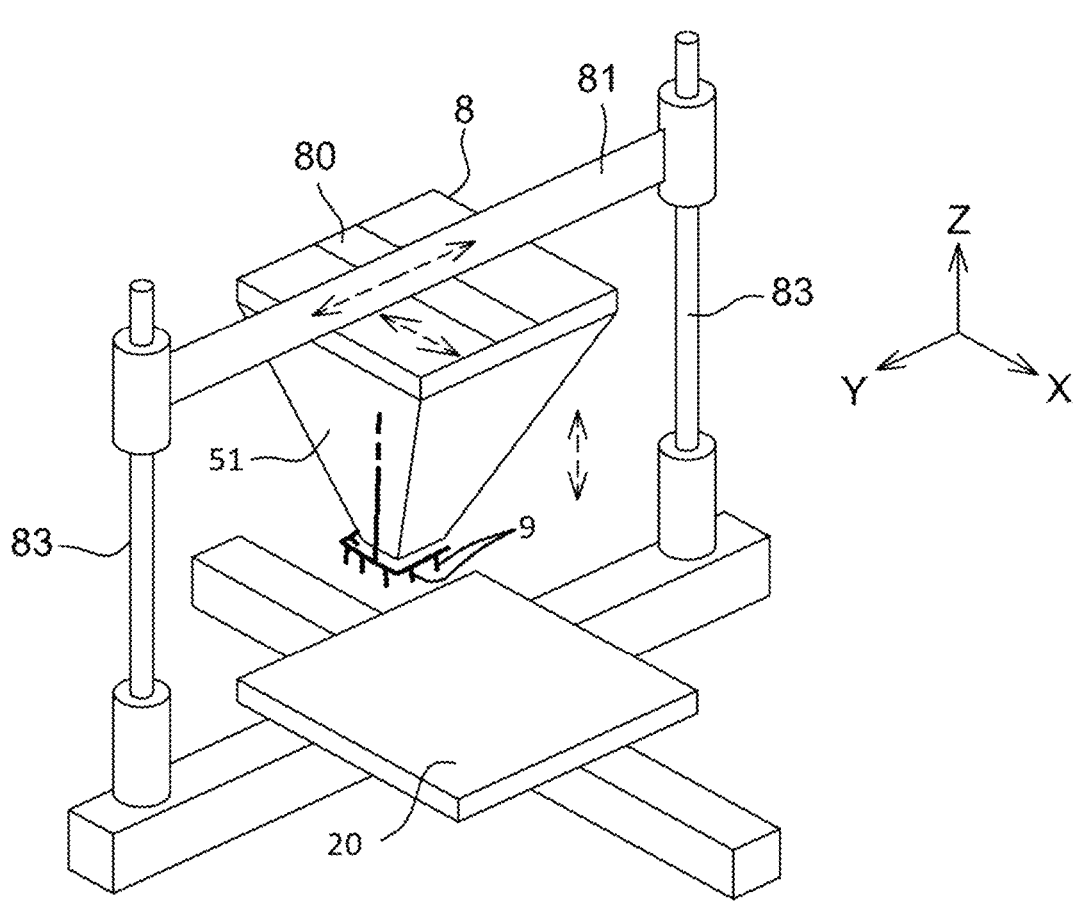
FIG. 7 is a variant embodiment of a manufacturing system according to the present invention.

FIG. 7 illustrates a variant embodiment where the extrusion head 51 is secured to a carriage 8 that is able to move along the X, Y and Z axes of a Cartesian reference frame. The carriage 8 is for example mounted so as to be able to move on a first runner—or rail—80 of axis X. This first runner is itself mounted so as to be able to move on a second runner 81 of axis Y. A driving mechanism, for example of the rack or jack type, controlled by the aforementioned management unit, makes it possible to translate the carriage 8 on the first runner 80, and to translate said first runner on the second runner 81. In this way the extrusion head 51 can be moved longitudinally and transversely with respect to the surface of the support 20. The vertical movement of the extrusion head 51 (on the Z axis) is made possible by mounting the second runner 81 so as to be able to move in translation on vertical guides 83. A driving mechanism, for example of the rack or jack type, controlled by the aforementioned management unit, makes it possible to translate the second runner 81 along vertical guides 83. A similar result is obtained by securing the extrusion head 51 to an overhead travelling crane.

According to another variant embodiment, the extrusion head 51 is fixed and it is the support 20 that is moved. It is in this case the support 20 that is secured to a movement means of the aforementioned robotic arm 30 or carriage 8 type, the movement of said plate being controlled by the management unit.

According to a preferred embodiment, the extruded strand is deposited on the reception support 20 by the effect of gravity. It should be noted here that the expression "effect of gravity" relating to the extruded strand refers to the fact that the movement of the extruded strand, from its emergence from the extrusion head 51 to the reception support 20, is mainly constrained or directed by the weight of said strand. This effect is made possible in particular by the fact that the extrusion head 51 is disposed or oriented vertically, or in other words in the direction of application of the gravitational force. Naturally, it is also necessary to consider the thrust exerted by the extrusion die 50 on the extruded strand, or in other words the kinetic energy of the latter on emerging from the extrusion head 51, but this force or kinetic energy is also oriented along the axis, and in the direction, of the gravitational force.

Description of the Reception Support

Figure 3:
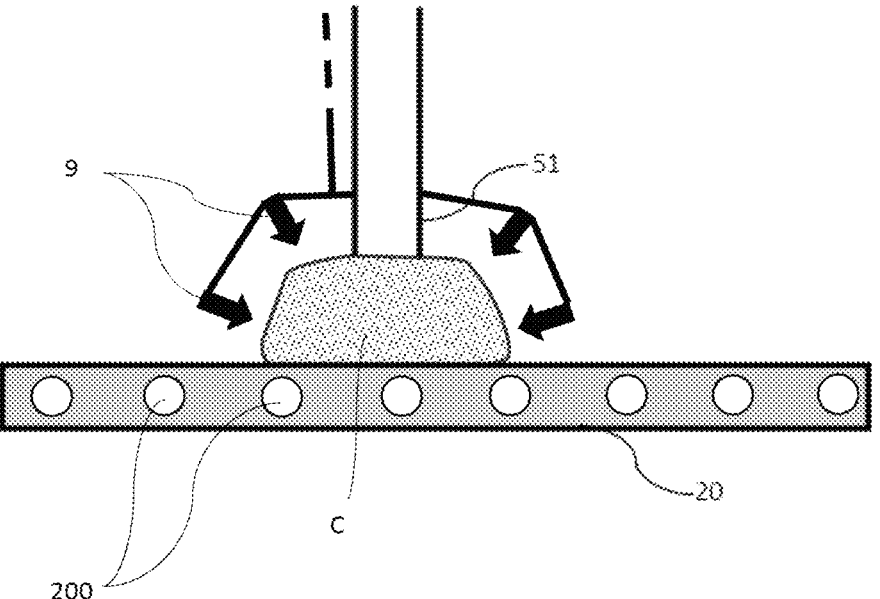
FIG. 3 is an enlargement of the part A present on FIG. 2, showing in particular the end of the extrusion head (the gas-blowing device being shown) and the reception support.

FIG. 3 shows schematically a first layer C of an extruded strand on the reception support 20. As can be seen in particular on FIG. 4, in the example selected for illustrating the invention, this reception support 20 is in the form of an L, with two rectangular portions 21, 22 with substantially identical shapes and dimensions extending perpendicularly with respect to each other. These two rectangular portions 21, 22 each form the end portions of the reception support 20 while a square portion 23 is disposed at the angle of the junction formed between these two end portions 21, 22. By way of example, the rectangular end portions 21, 22 have a length of between 50 cm and 2 m and a width of between 50 cm and 150 cm. The junction portion 23 is a square with a length of between 50 cm and 150 cm, it being considered that the width of the end portions 21, 22 is advantageously equal to the length of the side of the junction portion 23 so that the end edges of the reception support 20 are indeed continuous and essentially linear or rectilinear.

According to one embodiment, this reception support 20 has a thickness of between 5 mm and 30 cm. Secondary functions of this reception support 20 consist in receiving the extruded strand without the latter adhering to the reception support 20, or of course being deformed or degraded by the latter.

Considering this reception support 20, an important aspect lies in the location thereof around the robotic arm 30, or at least partly around this robotic arm 30. Thus the reception support 20 here is in the rough shape of an L, the robotic arm 30 being located in proximity to the junction portion 23 substantially at equal distances from the end portions 21, 22. Provision can also be made for the reception support 20 to be in the general form of a square or circular frame surrounding the robotic arm 30, the latter being completely surrounded or enclosed by the reception support 20. Finally, the reception support 20 can have the rough shape of an I or the rough shape of a U with three sides surrounding the robotic arm 30.

According to one embodiment, the reception support 20 is mounted on a raised stand 40 that makes it possible to place the reception support 20 at a height from the floor of between twenty centimetres and one metre, so as to adapt to the dimensions of the robotic arm 30 and to facilitate the gripping and handling of the object 1 produced on the support 20.

Cooling of the First Layer of Extruded Strand

The applicant found surprisingly that, by cooling the support 20 (rather than heating it as recommended by the aforementioned documents FR3075313 and FR3069800), a first layer C is obtained having aesthetic and mechanical qualities and physicochemical properties that are optimum for the varied uses, in an often very rigorous environment, envisaged for the decorative object 1. Cooling the support 20 makes it possible to force the cooling of the first layer C by conduction. The extruded strand thus drops quickly in temperature so that the last polymerisation and/or cross-linking reactions are stopped outside the extrusion die. The first layer C is then fixed in an unstable state.

The selection of the cooling temperature of the support 20, and secondarily the nature or materials thereof, were determined after many trials and comparative tests. Some of the results of these trials and tests are presented in table 2 below referenced as [Table 2]. Results for heating (100° C.) of the support 20 are also presented in this table. Identical test pieces, obtained after extrusion of a composition consisting of 99% pure PET (+20 ppm of PVC, 10 ppm of water, and 10 ppm of PE), were formed to be able to perform the following standardised tests, i.e. in accordance with ISO 527-1 for determining the Young's modulus and the elongation at break. The shrinkage criterion is considered, optionally with a slight structural arrangement, in accordance with ISO 294.

The criterion preferentially sought in the context of the present invention is the elongation at break criterion, which must be sufficiently high to prevent the object being fragile. Another criterion is the shrinkage criterion, which must advantageously be no more than 2%.

TABLE 2

| reception support (plate) | Cooling T° | Shrinkage (%) | Young's modulus (MPa) | Elongation at break (%) |
|---|---|---|---|---|
| Stainless steel | 100° (heating) | >2 | 2900 | 12 |
| | 20° C. (ambient) | 2< | 1920 | 100 |
| | 5° C. | 2< | 2400 | 180 |
| | 0° C. | 2< | 2300 | 190 |
| | −5° C. | 2< | 2200 | 170 |
| | −20° C. | 2< | 1720 | 50 |
| Brass | 100° (heating) | >2 | 2850 | 16 |
| | 20° C. (ambient) | 2< | 2100 | 115 |
| | 5° C. | 2< | 2550 | 200 |
| | 0° C. | 2< | 2450 | 190 |
| | −5° C. | 2< | 2350 | 185 |
| | −20° C. | 2< | 1870 | 85 |
| Cupronickel | 100° (heating) | >2 | 2850 | 18 |
| | 20° C. (ambient) | 2< | 2200 | 120 |
| | 5° C. | 2< | 2680 | 210 |
| | 0° C. | 2< | 1980 | 180 |

TABLE 2-continued

| reception support (plate) | Cooling T° | Shrinkage (%) | Young's modulus (MPa) | Elongation at break (%) |
|---|---|---|---|---|
| | −5° C. | 2< | 2000 | 170 |
| | −20° C. | 2< | 1750 | 75 |
| Aluminium or aluminium alloy | 100° (heating) | >2 | 2200 | 10 |
| | 20° C. (ambient) | 2< | 1750 | 150 |
| | 5° C. | 2< | 2300 | 270 |
| | 0° C. | 2< | 2100 | 240 |
| | −5° C. | 2< | 2000 | 230 |
| | −20° C. | 2< | 1850 | 80 |
| Copper or copper alloy | 100° (heating) | >2 | 2100 | 20 |
| | 20° C. (ambient) | 2< | 1800 | 140 |
| | 5° C. | 2< | 2200 | 265 |
| | 0° C. | 2< | 2050 | 230 |
| | −5° C. | 2< | 1950 | 220 |
| | −20° C. | 2< | 1900 | 90 |

Firstly, by virtue of a cooling temperature below ambient temperature, preferentially in the range from −10° C. to +10° C., a first layer is obtained having low shrinkage and satisfactory, or even very satisfactory, mechanical properties. Furthermore, the extruded strand has good aesthetic qualities, and in particular a uniform colour, a smooth bright appearance, etc. Remarkably good results (in terms of shrinkage and mechanical and aesthetic properties) are obtained in the range from −10° C. to +10° C., but entirely satisfactory results are obtained outside this range when the cooling temperature is below ambient temperature.

The applicant also found that the cooling kinetics had an influence on the aesthetic qualities and the mechanical properties of the extruded strand. The best results are obtained when the rate of cooling of the first layer C is between 250° C./min and 350° C./min, preferentially between 290° C./min and 310° C./min and highly preferentially 300° C./min (+/−5° C./min).

Secondly, if to this first cooling characteristic the fact is added that the reception support 20 is made from aluminium, or from aluminium alloy, or from copper or from copper alloy, then the results in terms of shrinkage and mechanical properties are improved further. The support 20 then has an additional function of mechanical adhesion appropriate for the extruded strand. It is also found that the first layer C remains easily detachable, without degradation, from the reception support 20.

According to one embodiment, the support 20 furthermore has a covering intended to allow chemical adhesion of the extruded strand. This covering consists of a polymer covering, from a few microns (μm) up to one or more millimetres (no more than 2 mm). Preferably this covering consists of a polyetherimide (PEI).

Figure 4:
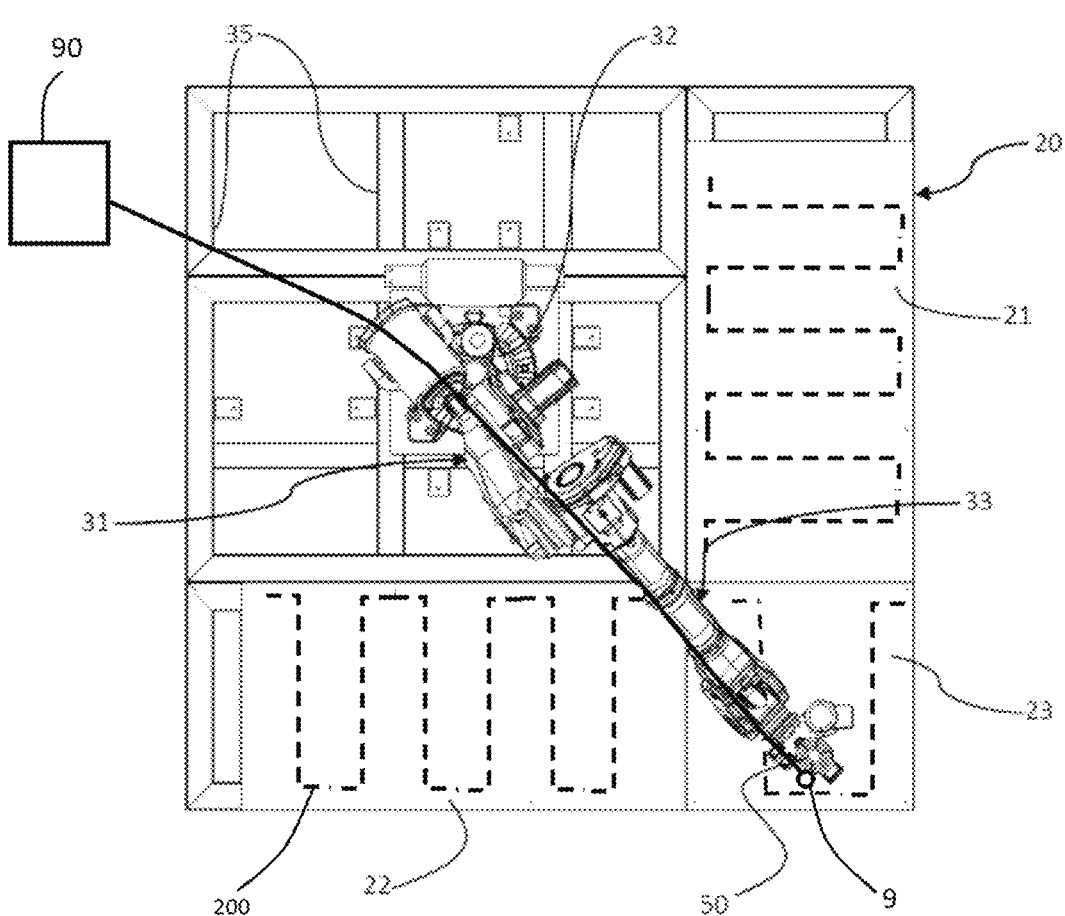
FIG. 4 is a plan view of the system visible on FIG. 2 (the gas-blowing device being shown).
Figure 5:
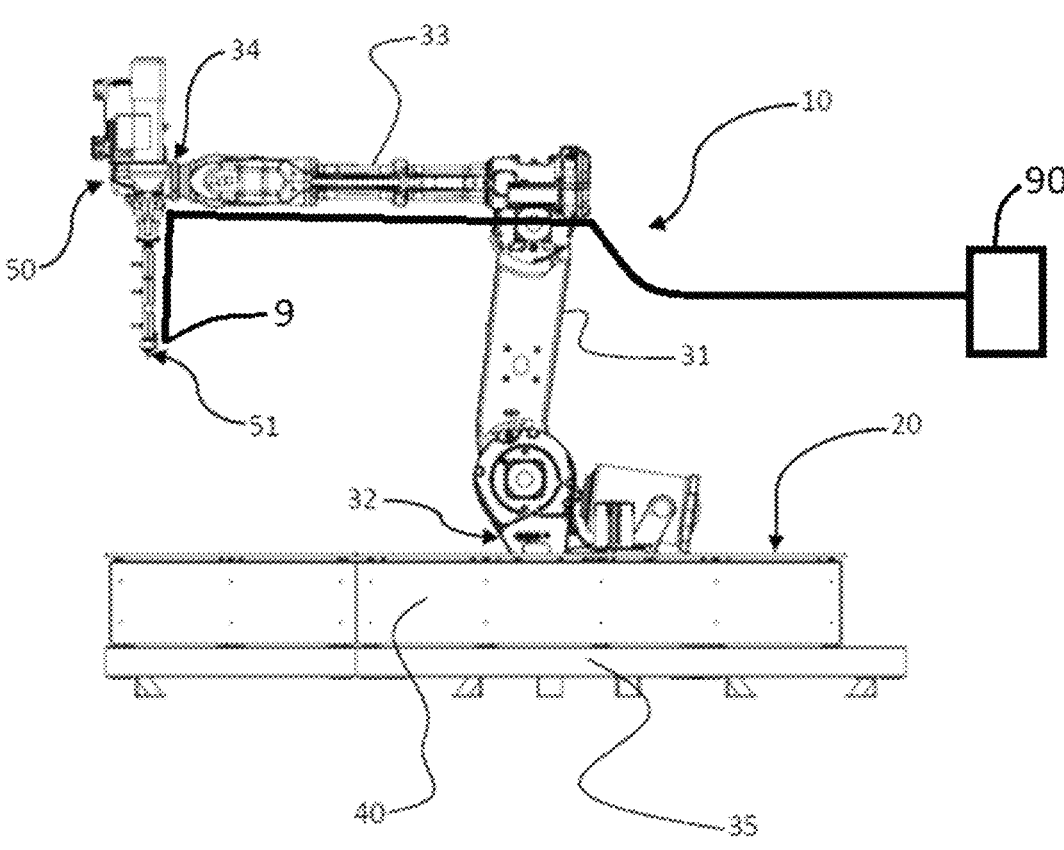
FIG. 5 is another side view of the system visible on FIG. 2 (the gas-blowing device being shown).
Figure 6:
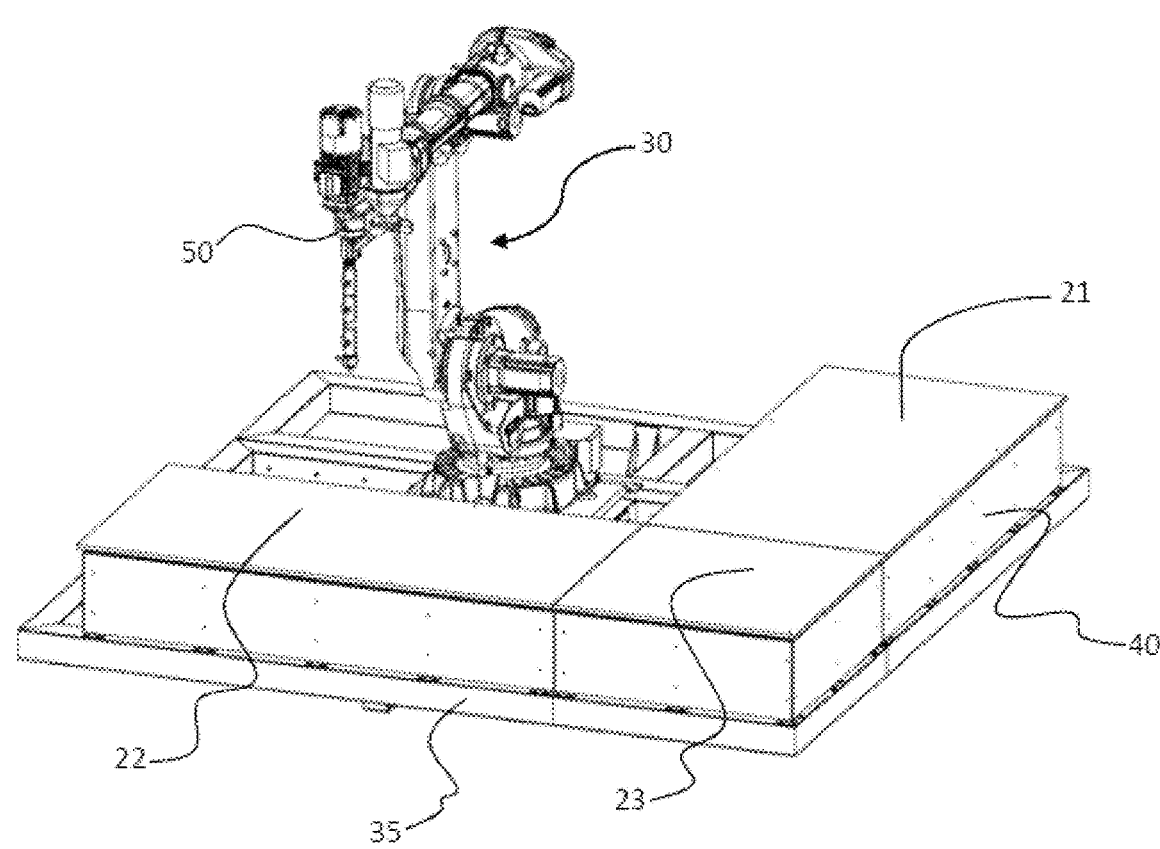
FIG. 6 is a perspective view of the system visible on FIG. 2 (the gas-blowing device not being shown for reasons of clarity).

According to one embodiment illustrated on FIGS. 3 and 4, the support 20 incorporates a cooling circuit in which a cold fluid (glycol water, expanded air, etc) circulates and which will cool said support. This fluid will absorb the heat of the strand when it is extruded onto the support 20 and cool it. Other means for cooling the support 20 suiting a person skilled in the art can be envisaged.

Cooling the Strand by Gas Blowing

The applicant also found surprisingly that, by cooling the extruded strand C (rather than heating it as recommended by the aforementioned documents FR3075313 and FR3069800), a strand is obtained having optimum aesthetic and mechanical qualities and physical and chemical properties for the varied uses, in an often very rigorous environment, envisaged for the decorative object 1. Blowing a gas onto the extruded strand C forces cooling thereof by convection. The extruded strand thus drops quickly in temperature so that the last polymerisation and/or cross-linking reactions are stopped outside the extrusion die. The strand C is then fixed in an unstable state.

The selection of the cooling temperature (i.e. the temperature of the bone gas) was determined after many trials and comparative tests. Some of the results of these trials and tests are presented in table 3 below referenced as [Table 3]. Results for heating (100° C.) of the strand are also presented in this table. Identical test pieces, obtained after extrusion of a composition consisting of 99% pure PET (+20 ppm of PVC, 10 ppm of water, and 10 ppm of PE), were formed to be able to perform the following standardised tests, i.e. in accordance with ISO 527-1 for determining the Young's modulus and the elongation at break. The shrinkage criterion is considered, optionally with a slight structural arrangement, in accordance with ISO 294.

The criterion preferentially sought is the elongation at break criterion, which must be sufficiently high to prevent the object being fragile. Another criterion is the shrinkage criterion, which must advantageously be no more than 2%.

TABLE 3

| Cooling T° | Shrinkage (%) | Young's modulus (MPa) | Elongation at break (%) |
|---|---|---|---|
| 100° (heating) | >2 | 2200 | 10 |
| 20° C. (ambient) | 2< | 1750 | 150 |
| 5° C. | 2< | 2300 | 270 |
| 0° C. | 2< | 2100 | 240 |
| –5° C. | 2< | 200 | 230 |
| –20° C. | 2< | 1850 | 80 |

Firstly, by virtue of a cooling temperature below or equal to ambient temperature, preferentially in the range from –10° C. to +10° C., a strand C is obtained having low shrinkage and satisfactory, or even very satisfactory, mechanical properties. Furthermore, the extruded strand C has good aesthetic qualities, and in particular a uniform colour, a smooth bright appearance, etc. Remarkably good results (in terms of shrinkage and mechanical and aesthetic properties) are obtained in the range from –10° C. to +10° C., but entirely satisfactory results are obtained outside this range when the cooling temperature is below ambient temperature.

The applicant also found that the cooling kinetics had an influence on the aesthetic qualities and the mechanical properties of the extruded strand. The best results are obtained when the rate of cooling of the strand C is between 250° C./min and 350° C./min, preferentially between 290° C./min and 310° C./min and highly preferentially 300° C./min (+/–5° C./min).

The gas blown onto the strand C may be compressed air or gaseous nitrogen (dinitrogen). A dry gas is preferentially used the dew point of which is below—20° C., preferentially below or equal to –40° C. This is because, as is clear from [Table 1], humidity may have a negative influence on the properties of the strand. This dew point can be measured with conventional measuring appliances, for example a thermohygrometer sold by the company TROTEC® under the reference T260.

In the case of an object 1 with a multilayer structure, the first layer can be cooled by means of the reception support 20 and the following successive layers are next cooled by gas blowing. According to another embodiment, gases blown onto the first layer of extruded strand on the support 20 (which may be cooled or not) and, where applicable, onto the following successive layers.

According to one embodiment, the steps of extruding the strand C and blowing the gas are synchronised, these two steps being implemented concomitantly during the movement of the extrusion head 51. In other words, the strand is cooled as soon as it is deposited on the support 20 and/or on another lower layer in the case of a multilayer structure.

According to one embodiment illustrated on FIGS. 2 to 6, one or more nozzles 9 for blowing the gas (for example from 1 to 10 nozzles) are secured to the extrusion head 51. It is thus ensured that the path of the nozzles 9 coincides with the path of the extrusion head when the latter is extruding the strand C. According to the width of the strand C and to accelerate cooling thereof, it may be advantageous to provide a plurality of nozzles arranged so that each of them acts simultaneously on a portion of the surface of said strand. According to one embodiment, these nozzles 9 are connected to a compressor with dehydrating and refrigerating dryer 90. According to another embodiment, the cooling is done by means of a vortex tube secured at the cooling head 51. It is possible for example to use a vortex tube with nozzles sold by the company Meech® under the reference Coldstream®.

According to a variant embodiment, the blowing nozzle or nozzles are secured to a movement means distinct from that of the extrusion head 51. It is possible for example to install the nozzles on another robotic arm that is controlled so that said nozzles move at the same time as the extrusion head 51. In particular, the two robotic arms can be controlled by the same management unit.

Although the invention has been described in relation to several particular embodiments, it is obvious that it is in no way limited thereto and that it comprises all the technical equivalents of the means described as well as combinations thereof if these fall within the scope of the invention. Furthermore, one or more features and/or steps disclosed solely in one embodiment can be extended to other embodiments. Likewise, one or more features and/or steps disclosed solely in one embodiment can be combined with one or more other features and/or steps disclosed solely in another embodiment.

The arrangement of the various elements and/or means and/or steps of the invention, in the embodiments described above, must not be understood to require such an arrangement in all implementations. Various variants can be provided, and in particular:

According to one embodiment, only the extrusion head 51 is secured to the robotic arm 30, the extrusion die 50 being offset from said arm.

The form and the dimensions of the reception support 20 are variable, according to the decorative object 1 to be produced, but especially according to the arrangement and dimensions of the robotic arm 30. The larger the latter, the more varied and larger can be the dimensions of the reception support 20.

The robotic arm 30 can have as many sections as necessary or useful for manufacturing the decorative object 1. In the same manner, the form and the degree of freedom of the robotic arm 30 are variable provided that they offer the possibility of bringing the extrusion head 51 to the required height of the reception support 20, having regard to the opening diameter of the extrusion head 51. Provision can also be made for there to be a plurality of robotic arms 30, for example at least two robotic arms 30 working in concert to manufacture a decorative object 1 according to the invention.

In the case of an object 1 with a multilayer structure, the first layer of extruded strand can be cooled not only by conduction with a cooled reception support 20 but also by convection by gas blowing. Equally, when the first layer of extruded strand is cooled by conduction with the cooled reception support 20, the other layers can be cooled by convection by gas blowing, or not be cooled.

Means other than the nozzles 9 can be used for blowing gas onto the extruded strand, for example fans or blowing orifices.

The use of the verbs "have", "comprise" or "include" and their conjugated forms does not exclude the presence of elements or steps other than those stated in a claim.

In the claims, any reference sign between parentheses should not be interpreted as a limitation of the claim.

The invention claimed is:

1. A method for manufacturing a decorative object from at least a first layer of a hot-extruded strand of a polymer-based composition, including a step of passing a polymer-based composition through an extrusion die from an inlet supplying said composition to an extrusion head from which the extruded strand emerges in an ambient environment, the first layer of extruded strand being deposited on a reception support, the method comprising steps of:

heating the polymer-based composition so that the temperature of the extruded strand, at the outlet of the extrusion head, is between 200° C. and 300° C., cooling the reception support so as to force the cooling of the first layer of extruded strand by conduction, and a step of using the polymer-based composition comprising recycled polyethylene terephthalate or a mixture of recycled polyethylene terephthalate and non-recycled polyethylene terephthalate, wherein the cooling temperature of the reception support is below the temperature of the ambient environment, and wherein the reception support is cooled to a temperature of between −10° C. and +10° C.

2. The method according to claim 1, wherein the cooling temperature of the reception support is selected so that the cooling rate of the first layer of extruded strand is between 250° C./min and 350° C./min.

3. The method according to claim 1, wherein the reception support is produced from a material selected from the following family: aluminium, aluminium alloy, copper and copper alloy.

4. The method according to claim 1, wherein the polymer-based composition has at least 50% by weight recycled polyethylene terephthalate.

5. The method according to claim 1, wherein the extruded strand is cooled by blowing a gas so as to force the cooling of said strand by convection, said gas being blown at a temperature of less than or equal to the temperature of the ambient environment.

6. The method according to claim 5, wherein the decorative object comprises a plurality of layers of extruded strands, each successive layer, after the first layer of extruded strand, being cooled by blowing a gas so as to force the cooling of said strand by convection, said gas being blown at a temperature of less than or equal to the temperature of the ambient environment.

7. The method according to claim 5, wherein the temperature of the gas is selected so that the cooling rate of the extruded strand is between 250° C./min and 350° C./min.

8. The method according to claim 5, wherein the temperature of the gas is between −10° C. and +10° C.

9. The method according to claim 5, wherein the extrusion of the strand and the blowing of the gas are implemented concomitantly during the movement of the extrusion head along the path.

10. The method according to claim 5, further comprising a step of securing one or more gas-blowing nozzles to the extrusion head.

11. The method according to claim 5, further comprising a step of securing one or more gas-blowing nozzles to a movement means, said movement means being controlled so that the nozzle or nozzles move at the same time as the extrusion head and on the same path.

12. The method according to claim 1, further comprising steps of:

securing the extrusion head to a robotic manipulation arm, and controlling the arm so as to move the extrusion head on a path so that the extruded strand forms the decorative object having at least one curved contour.

13. The method according to claim 1, further comprising steps of:

securing the reception support to a movement means, and controlling the movement means so as to move the reception support on a path so that the extruded strand forms a decorative object having at least one curved contour.

\* \* \* \* \*